(12) United States Patent
Uchida et al.

(10) Patent No.: US 6,696,956 B1
(45) Date of Patent: Feb. 24, 2004

(54) EMERGENCY DISPATCHING SYSTEM

(76) Inventors: Junji Uchida, 5-2-403, Satukidaira 2-chome, Misato-shi, Saitama 341-0021 (JP); Kyoko Uchida, 5-2-403, Satukidaira 2-chome, Misato-shi, Saitama 341-0021 (JP)

( * ) Notice: Subject to any disclaimer, the term of this patent is extended or adjusted under 35 U.S.C. 154(b) by 0 days.

(21) Appl. No.: 09/979,675
(22) PCT Filed: May 9, 2000
(86) PCT No.: PCT/JP00/02963
 § 371 (c)(1),
 (2), (4) Date: Nov. 6, 2001
(87) PCT Pub. No.: WO00/68913
 PCT Pub. Date: Nov. 16, 2000

(30) Foreign Application Priority Data

May 10, 1999 (JP) ............................................ 11-128688

(51) Int. Cl.$^7$ ............................................... G08B 23/00
(52) U.S. Cl. ............................... 340/573.1; 340/573.4; 340/539.18; 361/679; 455/404.1; 379/40; 379/41; 379/45; 379/46; 379/49; 379/51
(58) Field of Search .......................... 340/573.1, 573.4, 340/531; 600/539.18, 300, 504; 361/679; 379/37, 38, 40, 41, 42, 43, 44, 45, 46, 47, 48, 49, 51; 455/404.1, 404.2

(56) References Cited

U.S. PATENT DOCUMENTS

| | | | | |
|---|---|---|---|---|
| 5,228,449 A | * | 7/1993 | Christ et al. ................. | 600/504 |
| 5,305,370 A | * | 4/1994 | Kearns et al. ................. | 379/45 |
| 5,555,286 A | * | 9/1996 | Tendler ..................... | 455/404.2 |
| 5,742,666 A | * | 4/1998 | Alpert ...................... | 455/404.2 |
| 6,504,908 B1 | * | 1/2003 | Bellomo et al. ............... | 379/38 |
| 6,519,463 B2 | * | 2/2003 | Tendler ...................... | 455/456 |
| 6,544,171 B2 | * | 4/2003 | Beetz et al. ................. | 600/300 |
| 6,559,759 B2 | * | 5/2003 | Chien et al. ............. | 340/425.5 |

FOREIGN PATENT DOCUMENTS

| | | | |
|---|---|---|---|
| JP | 6-253042 A | * | 9/1994 |
| JP | 9-28681 A | * | 2/1997 |
| JP | 9-128674 A | * | 5/1997 |
| JP | 11-112695 A | * | 4/1999 |

* cited by examiner

Primary Examiner—Benjamin C. Lee
(74) Attorney, Agent, or Firm—Darby & Darby

(57) ABSTRACT

An emergency dispatching system which can reduce the occurrence of false reports, reliably send the first report to relatives or the like in an emergency, and automatically detect even the occurrence of an internal danger. Emergency dispatching system 10 comprises a communication device 12 for a monitored person, a sensor 14 for sensing the vital reaction or the like of the monitored person, contact address storage means 18 where a telephone number to contact in case of emergency is stored, message storage means 22 where a message to be sent in case of emergency is stored, safety judging means 16 for judging the safety of the monitored person based on the output of the sensor 14, dispatch notifying means 28 for warning the monitored person of the emergency when it is assumed by the safety judging means 16 that an emergency has occurred, automatic dialing means 20 for generating a dialing signal and outputting it to the communication device 12 in case where a safety confirmation input is not detected within a certain time since warning, and message dispatching means 26 for dispatching the message to a communication device 38 at a contact address after establishment of a communication line between the communication device 12 and the communication device 38.

25 Claims, 9 Drawing Sheets

EMERGENCY DISPATCHING SYSTEM

TECHNICAL FIELD

The present invention relates to an emergency dispatching system, and, more particularly, to a system which can reliably notify a monitoring person, such as a relative or a caretaker, of the occurrence of an unusual event when the unusual event has occurred on a person who lives alone, such as an elderly person, a sick person, a person who takes up a job, leaving a family behind, or a single woman.

BACKGROUND ART

Recently, elderly people who live alone are increasing due to the progress of the aging society and nuclear families, and relatives should regularly phone or visit them to check the safety of the elderly people. Even in case of living with elderly people, particularly, sick elderly people and dementia elderly people, caretakers should normally attend them, and even when the caretakers go out for a short period of time, they should call outside to regularly check the safety.

With regard to persons who take up jobs, leaving their families behind or single persons, not as urgent as elderly people though, actually relatives would worry about their safety and regularly phone them or repeatedly visit them.

Dangers that may occur on those persons who live alone include an internal type (self-brought type) (hereinafter called "internal danger"), such as a spasm of sickness, heavy bone fracture caused by falling or falling down unconscious in addition to an external type (hereinafter called "external danger"), such as a gas leakage or fire in a house or break-in of a burglar.

There are various home security systems to protect persons who live alone against dangers. While the specific contents of those systems range widely, they are fundamentally designed to detect the occurrence of the dangers that face a monitored person by various sensors (burglar sensor, smoke sensor, temperature sensor, gas leak sensor, etc.) and notify a predetermined security company or the like.

The introduction of those security systems can certainly relieve relatives of some burden of regularly phone calls or visits.

However, the conventional security systems are designed in such a way that when various sensors detect the occurrence of an emergency, large-scale measures are taken, such as immediate activation of a sprinkler or dispatching of a person in charge from a security company, so that a relatively high contract fee should be paid.

Further, the sensors always face a possibility of malfunction, so that false reporting besides the activation of a sprinkler or dispatching of a person from a security company would make mental and economical burdens of a monitored person and relatives or the like unbearable.

Furthermore, although the conventional security systems are relatively good at detecting an external danger, they hardly cope with the detection of an internal danger but can merely recognize the depression of a report button by a monitored person himself at best. Therefore, there arise such a problem that even when a monitored person falls into a condition where it is difficult to even depress the report button, an effective aiding measure cannot be taken against it immediately.

The invention has been devised to overcome the problems of the conventional systems and aims at realizing an emergency dispatching system which is designed to be able to reduce the occurrence of false reports as much as possible and reliably send the first report to relatives or the like in an emergency, and to automatically detect even the occurrence of an internal danger.

DISCLOSURE OF INVENTION

To achieve the object, an emergency dispatching system according to the invention comprises a communication device on a monitored person side which is connectable to a communication line; at least one sensor for sensing a vital reaction of a monitored person or an external danger thereof; contact address storage means where at least one telephone number to contact in case of emergency is stored; message storage means where at least one message to be sent in case of emergency is stored; safety judging means for judging a safety of the monitored person based on an output of the sensor; dispatch notifying means for warning the monitored person of an emergency when it is assumed by the safety judging means that the emergency has occurred; automatic dialing means for generating a dialing signal corresponding to a telephone number of the contact address and outputting the dialing signal to the communication device on the monitored person side, thereby establishing a call to a communication device at the contact address, in case where a safety confirmation input is not detected within a certain time since warning made by the dispatch notifying means; and message dispatching means for sending an emergency message stored in the message storage means to the communication device at the contact address via the communication device on the monitored person side after establishment of a communication line between the communication device on the monitored person side and the communication device at the contact address. The "telephone number" includes the number of a pager.

The "vital reaction" means an event which indicates that a monitored person is living a normal life, and the present system indirectly recognize the safety of the monitored person by detecting whether or not there is the vital reaction of the monitored person, such as "washing a face", "passing through a corridor", "boiling water", "using a toilet" or "taking a bath".

Therefore, the internal danger of the monitored person can also be automatically detected.

When the monitored person himself or a caretaker performs an input operation for safety confirmation after warning made by the dispatch notifying means, emergency reporting to the communication device at the contact address will not be made naturally.

That is, the emergency dispatching system is designed in such a way that even when the safety judging means has assumed the occurrence of an emergency based on the outputs of individual sensors, emergency reporting is not made immediately to the contact address, but the monitored person is warned and emergency dispatching is done unless an input on safety confirmation by the monitored person is detected. It is therefore possible to prevent false reports.

After the safety judging means decides that "an emergency has occurred", dialing is automatically made to a communication device registered as a contact address, so that a relative can reliably receive the first report once the number of the portable telephone or the like of the relative is registered as the contact address.

In other words, as long as a report is not made, the safety of the monitored person can be assumed, making it unnecessary to make regular telephone calls to check the safety, like the past.

As the first report on the occurrence of an emergency is reliably dispatched to a relative or the like, this creates a room for self-helping protection and helping activities provided mainly by the relative or the like, making it possible to minimize the use of an external institute that demands a relatively high cost.

As the communication device on the monitored person side, a radio telephone (a mobile communication terminal) such as a portable telephone, PHS, may be used. In this case, the contact address storage means, the message storage means, the safety judging means, the dispatch notifying means, the automatic dialing means and the message dispatching means have only to be retained in a charger of the radio telephone, and the sensor has only to be connected to the safety judging means by a cable or wirelessly.

It is desirable to have such a structure that charging state detecting means for detecting whether or not the radio telephone is set in the charger is provided, and the safety monitoring operation of the safety judging means starts at the same time the radio telephone is set in the charger, and the safety monitoring operation is temporarily canceled at the same time the radio telephone is detached from the charger.

As a result, a monitored person can use this emergency dispatching system through ordinary actions of carrying out a portable telephone when going out and setting it in the charger after coming home, and a psychological oppression of being monitored is not imparted on the monitored person.

In this case, in case of forgetting carrying out a portable telephone, it is desirable to provide call detecting means for detecting a ring-back tone or ringing vibration when a call is made to the radio telephone, and to take such a structure that the safety monitoring operation of the safety judging means is temporarily canceled in case where the ring-back tone or ringing vibration of the radio telephone continues for a predetermined time or longer.

Another emergency dispatching system according to the invention has a radio telephone on a monitored person side which is connectable to a communication line, and at least one sensor for sensing a vital reaction of a monitored person or an external danger thereof, and is characterized in that provided on the radio telephone side are contact address storage means where at least one telephone number to contact in case of emergency is stored, message storage means where at least one message to be sent in case of emergency is stored; safety judging means for judging a safety of the monitored person based on an output of the sensor, dispatch notifying means for warning the monitored person of an emergency when it is assumed by the safety judging means that the emergency has occurred, automatic dialing means for generating a dialing signal corresponding to a telephone number of the contact address, thereby making a call, in case where a safety confirmation input is not detected within a certain time since warning made by the dispatch notifying means, and message dispatching means for sending an emergency message stored in the message storage means to the communication device at the contact address after establishment of a communication line with the communication device at the contact address, and that the sensor is connected to the safety judging means by a cable or wirelessly.

As the essential structural elements of the emergency dispatching system are retained in the radio telephone such as a portable telephone, it is possible to detects a danger at the time of going out and ensure emergency dispatch.

In this case, it is desirable to equip the radio telephone with present-position information outputting means for identifying a present position of the radio telephone and outputting present position information, and dispatch present position information from the present-position information outputting means to the communication device at the contact address at the time of the emergency dispatching by the message dispatching means. The "present-position information outputting means" mentioned here corresponds to, for example, a GPS receiver.

As a result, a danger can be detected at the time of going out and at the same time a monitoring person at the contact address can identify the rough present position of the monitored person, thus ensuring prompt aiding activities.

It is desirable to equip the emergency dispatching system with temporal condition storage means in which a valid time zone for judging the safety based on the output result from each sensor is set beforehand. In this case, the safety judging means can assume the occurrence of an emergency when an output indicating the vital reaction of the monitored person is not acquired from the sensor during the valid time zone.

A safe interval in the valid time zone can be set in the temporal condition storage means. In this case, the safety judging means can assume the occurrence of an emergency in case where an output indicating a vital reaction of the monitored person is not obtained from the sensors at all during the safe interval.

The structure may be designed in such a way that a plurality of messages associated with outputs of individual sensors are stored in the message storage means in advance, and a message corresponding to that sensor output which has become a basis for judgment of the occurrence of an emergency by the safety judging means is dispatched to the communication device at the contact address via the message dispatching means.

It is desirable that each emergency dispatching system mentioned above should be designed in such a way as to further comprise caller-number identifying means for identifying a telephone number of a caller when a call is made to the communication device on the monitored person side, and emergency-dispatch requesting right holder storage means where a telephone number of a person who has been authorized beforehand as an emergency-dispatch requesting right holder is stored, and that the safety judging means judges whether or not the caller is the emergency-dispatch requesting right holder by comparing the telephone number stored in the emergency-dispatch requesting right holder storage means with a telephone number output from the caller-number identifying means, it is assumed that an emergency has occurred and the monitored person is warned of that emergency via the dispatch notifying means when the caller is the emergency-dispatch requesting right holder and calling from the caller matches with a preset pattern, and the message dispatching means dispatches an emergency message to the communication device at the contact address when the safety confirmation input is not detected within a certain time since warning made by the dispatch notifying means.

As a result, when there is objectively a high probability of the monitored person being in danger, emergency dispatch can be made based on the intention of a pre-authorized third person.

In Japan, the long-term care insurance system has started since April of 2000, and payment for services provided by the long-term care insurance is based on in-home nursing care.

It can be expected that the emergency dispatching system according to the invention becomes an information infrastructure which contributes to the stability of the basis of in-home nursing care services, such as the capability of coping with not only an emergency state of a person who receives in-home nursing care but also a situation where, for example, a caretaker and a person who receives nursing care cannot move (strained back or the like of the caretaker), and the capability of adequately dispatching a traveling service vehicle in such a case.

Further, the properness, effectiveness and efficiency of the contents and time allotting of nursing care services can be expected, resulting in the possible outlook of both "sufficient payment of long-term care insurance" and "properness and reduction of the long-term care insurance fee".

BEST MODE FOR CARRYING OUT THE INVENTION

Figure 1:
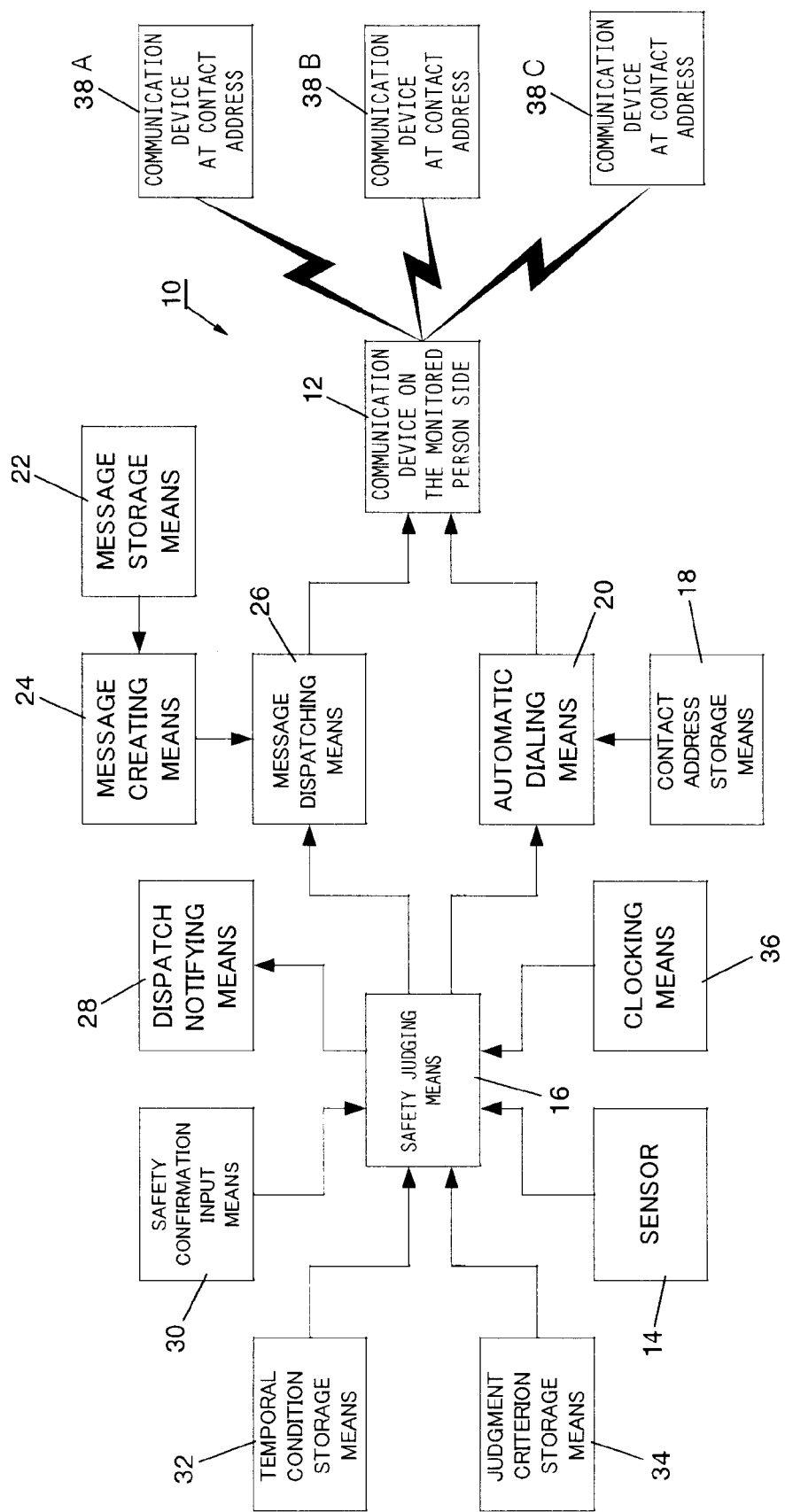
FIG. 1 is a functional block diagram illustrating a first emergency dispatching system according to the invention.

FIG. 1 is a functional block diagram illustrating a first emergency dispatching system 10 according to the invention. This first emergency dispatching system 10 comprises a communication device 12 on a monitored person side, a sensor 14, safety judging means 16, contact address storage means 18, automatic dialing means 20, message storage means 22, message creating means 24, message dispatching means 26, dispatch notifying means 28, safety confirmation input means 30, temporal condition storage means 32, judgment criterion storage means 34 and clocking means 36.

The communication device 12 on the monitored person side is typically a radio telephone, such as a portable telephone or PHS which a person who lives alone as a monitored person uses daily, but may be an ordinary fixed telephone or a personal computer or the like equipped with a communication capability.

The sensor 14 serves to detect a vital reaction which becomes a basis for determining the safety of a monitored person and various devices which meet the purpose can be used.

For example, they are a water flow rate sensor attached to a faucet in a washroom, a limit switch mounted to the flush lever of a flush toilet, a photosensor attached to a corridor where a person frequently walks around, a pressure sensor placed in the mattress of a bed, and so forth.

Or, a simple switch may be used as a sensor. In this case, not only an exclusive push button switch, but a wall button for a room light, remote control switches for TV (power switch and channel switches), a gas ignition switch, etc. can be used as the sensor 14.

Sensors for detecting the occurrence of external dangers, such as gas leakage, fire and break-in, may be included. For example, they are a burglar sensor for detecting breaking of a window glass, a gas leak sensor, a fire sensor and so forth.

At least the valid time zone for each sensor 14 is set beforehand in the temporal condition storage means 32.

The safety judging means 16 judges the safety of the monitored person by adequately referring to data set in the temporal condition storage means 32 and checking the output status from the sensor 14 which is in the valid time zone against a judgment criterion preset in the judgment criterion storage means 34.

Then, when there is any doubt about the safety of the monitored person based on the output status from each sensor 14, the dispatch notifying means 28 is activated and an operation to warn the monitored person is executed first. For example, sounding an alarm buzzer corresponds to the warning operation. Or, when the monitored person has a hearing defect, flickering a lamp corresponds to it.

As the monitored person who notices the warning operation demonstrates a safety confirming operation via the safety confirmation input means 30, the warning operation is canceled. For example, an exclusive push button switch corresponds to the safety confirmation input means 30.

In case where an input for the safety confirmation cannot be detected within a certain time, by way of contrast, the safety judging means 16 judges that an emergency has occurred, and sends the judgment result to the automatic dialing means 20 and message dispatching means 26.

The automatic dialing means 20 reads out telephone numbers of communication devices 38A to 38C at contact addresses registered in advance in the contact address storage means 18, and generates dialing signals corresponding to the telephone numbers. The dialing signal is sent to the communication device 12 on the monitored person side, which makes a call to the communication devices 38A to 38C at the contact addresses. Portable telephones or fixed telephones, pagers, facsimiles, personal computers equipped with a communication capability, and so forth, which relatives or the like use daily, correspond to the communication devices 38A to 38C at the contact addresses.

When a communication line is established between the communication device 12 on the monitored person side and the communication device 38 at the contact address, the message creating means 24 refers to a message registered beforehand in the message storage means 22, and generates a message signal (voice data, character data, image data) corresponding to that message. The message signal is sent to the message dispatching means 26, and is dispatched to the communication device 38 at the contact address via the communication device 12 on the monitored person side, thus realizing emergency reporting to a relative or the like.

In case where there are plural communication devices registered as contact addresses in case of emergency, the automatic dialing operation and message dispatching operation are repeated plural times.

Figure 2:
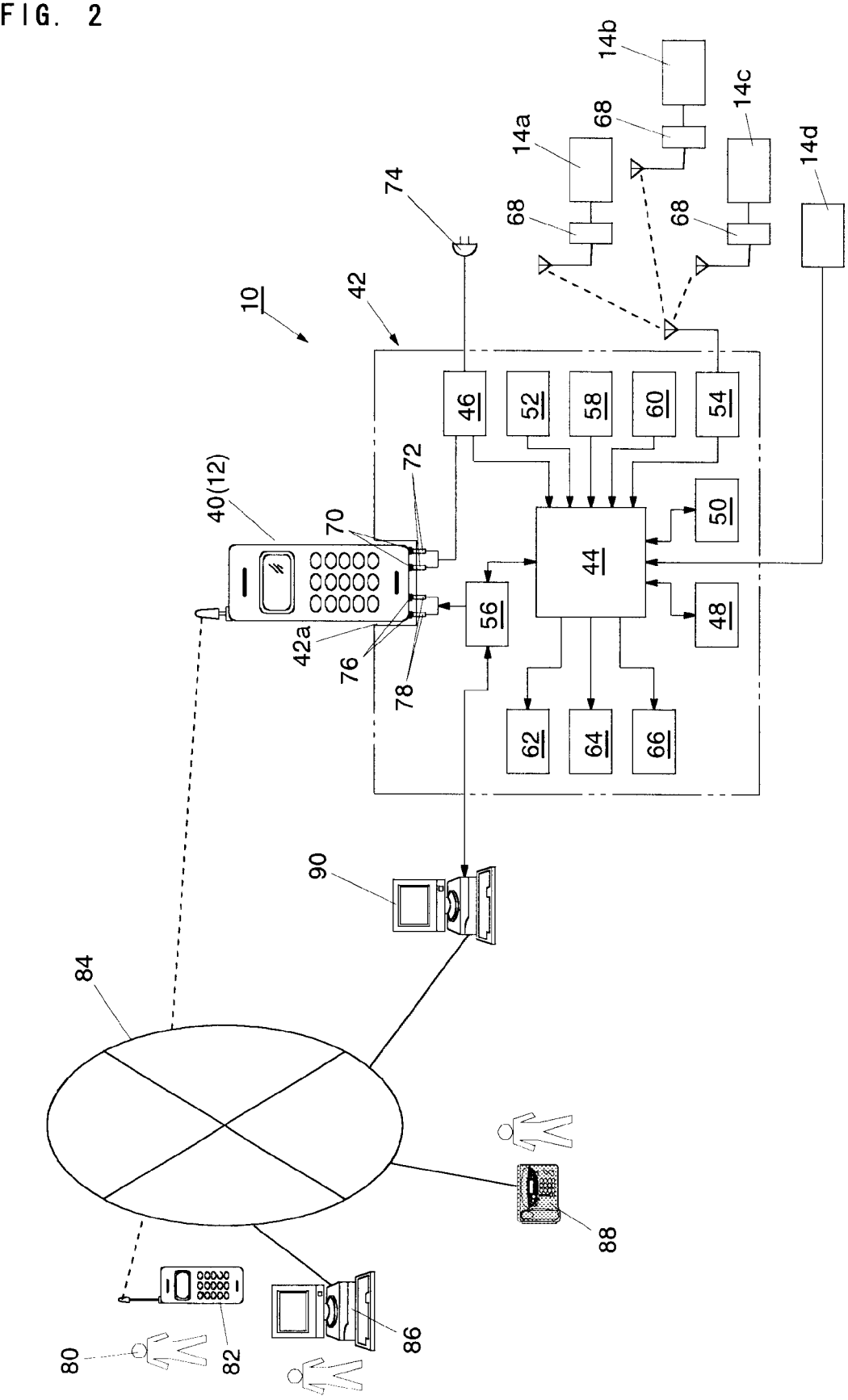
FIG. 2 is a conceptual diagram showing an example of the hardware structure of the first emergency dispatching-system.

FIG. 2 shows an example of the hardware structure of the first emergency dispatching system 10, which has a portable telephone 40 as the communication device 12 on the monitored person side and a dispatch control unit 42 which also serves as a charger for the portable telephone 40.

Located in the dispatch control unit 42 are a power suply circuit 46, a memory circuit 48 including a RAM, ROM and flash memory, a clock circuit 50, a vibration sensor 52, a radio processing circuit 54 and a communication processing circuit 56 in addition to a control circuit 44 comprised of a CPU (Central Processing Unit).

The dispatch control unit 42 has a microphone 58 for inputting voices, an operation panel 60 for entering various kinds of setting values, an LCD panel 62 for displaying the status of the unit, an alarm buzzer 64 and a lamp 66 for showing the charge status.

The power supply circuit 46, the memory circuit 48, the clock circuit 50, the vibration sensor 52, a radio processing circuit 54 the communication processing circuit 56, the microphone 58, the operation panel 60, the LCD panel 62, the alarm buzzer 64 and the lamp 66 are each connected to the control circuit 44 via an unillustrated interface circuit.

A plurality of sensors 14 are provided outside the dispatch control unit 42. Of those sensors 14, first to third sensors 14a to 14c are connected to the control circuit 44 via a radio transmission unit 68 and the radio processing circuit 54 or the like. A fourth sensor 14d, on the other hand, is connected to the control circuit 44 by a cable.

The portable telephone 40 has a pair of charge contacts 70 at its bottom, and placing the bottom into a charge recess 42a formed in the surface of the casing of the dispatch control unit 42 effects charging a built-in secondary battery.

That is, a pair of power feeding contacts 72 corresponding to the charge contacts 70 are exposed at the bottom of the recess 42a, and are connected to the power supply circuit 46. In the power supply circuit 46, commercial AC power externally supplied via a power supply plug 74 is converted to predetermined DC power and is charged in the secondary battery in the portable telephone 40 via the power feeding contacts 72 and the charge contacts 70.

Though not illustrated, power is supplied to individual sections in the dispatch control unit 42 via the power supply circuit 46.

A plurality of data input/output terminals 76 are further formed on the bottom of the portable telephone 40, and contacting the terminals 76 with a plurality of data input/output terminals 78 exposed at the bottom of the recess 42a can send a predetermined signal from the control circuit 44 to the portable telephone 40 via the communication processing circuit 56.

Stored in the ROM of the memory circuit 48 is a control program for achieving various functions of the first emergency dispatching system 10. As the control circuit 44 runs the control program, the first emergency dispatching system 10 is equipped with a function, such as the aforementioned safety judging means 16, automatic dialing means 20, message creating means 24, message dispatching means 26 or clocking means 36.

The flash memory portion of the memory circuit 48 accomplishes functions of the contact address storage means 18, message storage means 22, temporal condition storage means 32 and judgment criterion storage means 34.

Further, the alarm buzzer 64 corresponds to the dispatch notifying means 28 and a specific key on the operation panel 60 corresponds to the safety confirmation input means 30.

The clock circuit 50 feeds temporal data to the first emergency dispatching system 10.

Here, a photosensor provided near the entrance of a living room is used as the first sensor 14a. A limit switch attached to the flush lever of a toilet is used as the second sensor 14b, a water flow rate sensor provided at a faucet in a washroom is used as the third sensor 14c, and a gas leak sensor located near a gas range in a kitchen is used as the fourth sensor 14d.

Figure 3:
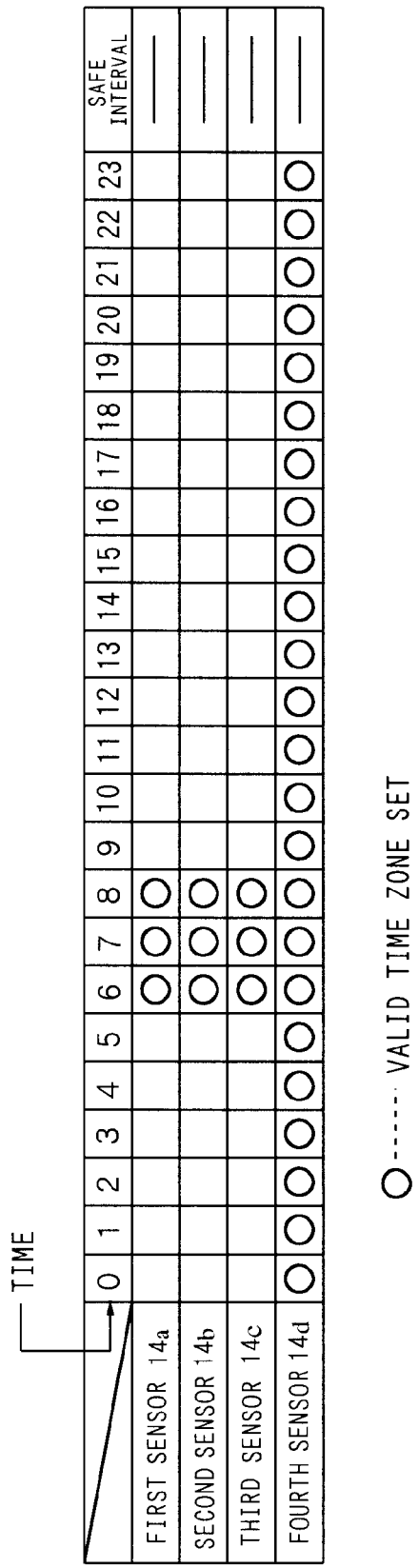
FIG. 3 is a timetable showing an example of the setting of valid time zones of individual sensors.

The valid time zones of the individual sensors 14a to 14d are set as shown in the timetable in FIG. 3.

Specifically, the valid time zones of the first to third sensors 14a to 14c are set to 6 AM to 8 AM. As a result, when the monitored person walks into the living room or uses the toilet or the washroom in this time zone, the first to third sensors 14a to 14c detect the event and send signals indicating it to the control circuit 44 of the dispatch control unit 42 wirelessly. In case where there is no outputs from the first to third sensors 14a to 14c in this time zone, on the other hand, the safety judging means 16 assumes that an emergency has occurred and sounds the alarm buzzer 64.

The valid time zone of the fourth sensor 14d is set to midnight to 23:00. As a result, while the monitored person is in the house, the fourth sensor 14d always monitors gas leakage. In case where the fourth sensor 14d makes an output indicating the occurrence of gas leakage, the safety judging means 16 assumes that an emergency has occurred and sounds the alarm buzzer 64.

The settings of those valid time zones are input through the operation panel 60 and are stored in the flash memory portion of the memory circuit 48 via the control circuit 44.

Figure 4:
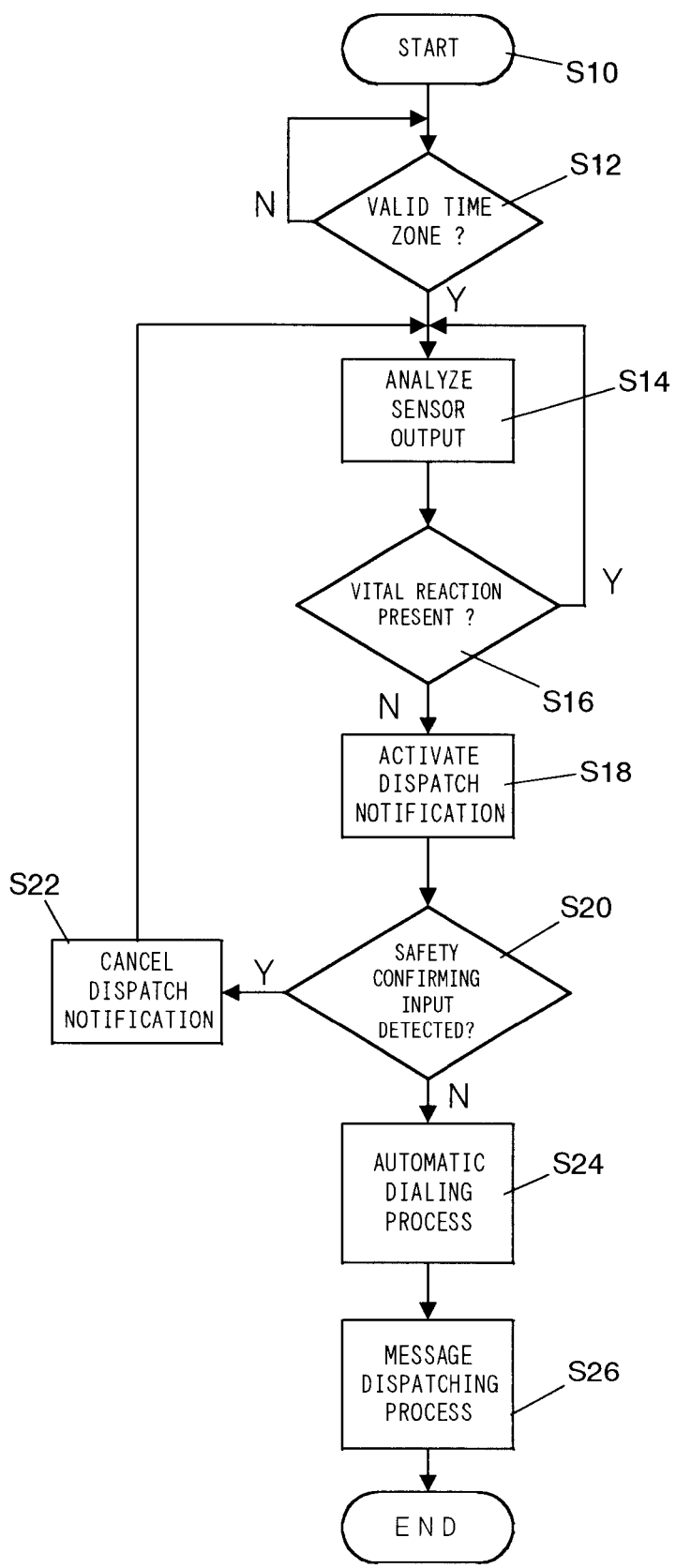
FIG. 4 is a flowchart illustrating an example of the operation of the first emergency dispatching system.

An example of the actual operation of the first emergency dispatching system 10 is described referring to the flowchart in FIG. 4.

First, the instant the user of the first emergency dispatching system 10 i.e., the monitored person comes home, the monitored person places the portable telephone 40 he is using in the charge recess 42a of the dispatch control unit 42. As a result, the DC power for charging is supplied to the secondary battery in the portable telephone 40 via the contacts 72 and 70 from the power supply circuit 46. The power supply circuit 46 sends a signal indicating the initiation of the charging to the control circuit 44.

Upon reception of the input of charge-initiation signal, the safety judging means 16 immediately goes to a safety monitoring mode (safety monitoring operation) (S10), and initiates analysis of the output signals of the sensors 14a to 14d (S14) by referring to the valid time zones of the sensors 14a to 14d (S12).

That is, when the output of one sensor 14 is in the valid time zone, the content of the output of this sensor 14 is evaluated based on the judgment criterion set in the judgment criterion storage means 34 to check whether or not an emergency has occurred.

In case where no outputs indicating the vital reaction have been obtained from the first to third sensors 14a to 14c at all during the period of 6 AM to 8 AM (S16), for example, it is assumed that the monitored person becomes unable to move for some reasons, and dispatch notification to sound the alarm buzzer 64 is activated (S18).

At this time, when the monitored person has simply slept away and no emergency has occurred particularly, the monitored person presses a safety confirming switch on the operation panel 60 himself to carry out a safety confirming input operation. By detecting this safety confirming input (S20), the safety judging means 16 cancels the assumption that an emergency has occurred and cancels the dispatch notification to stop the alarm buzzer 64 (S22) and resumes the safety monitoring operation.

In case where the monitored person has a spasm and cannot sit up in the bed, by way of contrast, the alarm buzzer 64 keeps sounding. Then, when no safety confirming input cannot be detected after a predetermined time (e.g., 5 minutes) has passed, the safety judging means 16 judges "the occurrence of an emergency" and instructs the automatic dialing means 20 to perform an automatic dialing process.

The instructed automatic dialing means 20 reads the telephone number of a contact address set in the contact address storage means 18 (e.g., the number of a portable telephone 82 owned by a first son 80 of the monitored person), generates a dialing signal corresponding to that number and sends the signal to the portable telephone 40 of the monitored person via the communication processing circuit 56 and the terminals 78 and 76 (S24). As a result, the portable telephone 40 makes a call to the portable telephone 82 of the first son 80, and a communication path is established between both portable telephones 40 and 82 via a public line network 84.

In parallel to the calling operation, the message creating means 24 reads out a message content preset in the message storage means 22 and generates a message signal corresponding to that message content and the type of the communication device at the contact address (as the communication device at the contact address is the portable telephone 82 in this case, a voice message signal is synthesized).

When the communication line between the portable telephones 40 and 82 is established, the message signal is sent to the portable telephone 40 via the communication processing circuit 56 and the terminals 78 and 76, and is dispatched to the portable phone 82 of the first son 80 (S26).

The message may be an ordinary one, such as "Something abnormal may happen to the subject. Please check.", but a content which matches with the sensor output based on which the judgment of the occurrence of an emergency has been made may be adopted.

In case where it is judged that an emergency has occurred due to the output indicating gas leakage from the fourth sensor 14d, for example, a voice message "There may be gas leakage in the house of the subject. Please check." is sent.

The message dispatching means 26 disconnects the line after repeating the voice message several times.

The person who received the message (first son 80) takes a measure according to the content of the message. First, he may dial the number of the portable telephone 40 of the monitored person to check if it is a false report.

In case where the monitored person does not answer after calling about a dozen times, it seems to be very likely that an emergency has occurred and he hurries to the house of the monitored person himself or contacts a relative or someone in the company (in case he takes up a job, leaving the family behind) living nearby and asks the person to go and see the situation.

At the same time, in case where there is a pre-contracted security company, hospital or the like, he may be able to contact it to hurry to the actual spot.

In case where the content of the message indicates gas leakage, it is desirable to immediately report to the fire station.

In case where there are plural telephone numbers registered as contact addresses in case of emergency, the automatic dialing means 20 and the message dispatching means 26 repeat the automatic dialing operation and message dispatching operation plural times to complete message dispatching to every contact address. At this time, when the portable telephone or fixed telephone of a contact address is busy, automatic dialing is repeated many times at given intervals.

A pre-contracted security company, hospital or the like may be registered as one of the contact addresses.

The communication device at the contact address may be a personal computer 86 equipped with a communication capability or a facsimile 88 besides the portable telephone 82 or fixed telephone. In this case, the message creating means 24 creates a message signal matching the characteristic of that communication device (character data or image data).

Further, the communication device on the monitored person side may likewise be a personal computer 90 equipped with a communication capability besides the portable telephone 40 or fixed telephone, so that a message can be dispatched through the personal computer 90. Here, the communication processing circuit 56 of the dispatch control unit 42 is connected to the serial port or parallel port of the personal computer 90 via a communication cable.

As the valid time zone is set for each of the sensors 14a to 14d in the first emergency dispatching system 10, the percentage of recognizing the occurrence of an emergency by the safety judging means 16 is improved and erroneous judgment can be prevented effectively.

In the night time zone (midnight to 6 AM), for example, persons are normally asleep so that even if there is no output indicating the vital reaction from the first to third sensors 14a to 14c at all, such should not be assumed to be "the occurrence of an emergency".

In case where gas leakage has occurred, by way of contrast, it is necessary to take an emergency measure even at night without delay, so that the valid time zone for the fourth sensor 14d which detects gas leakage should not be limited.

When "the occurrence of an emergency" is assumed by the safety judging means 16, emergency reporting is not done immediately, but the dispatch notifying means 28 warns the monitored person first, thus making it possible to effectively prevent relatives from unnecessarily worrying by false reports.

With the use of the first emergency dispatching system 10, if there is no report even after the valid time zone passes, relatives are relieved, knowing that the monitored person is safe today, saving the trouble of regularly making a phone call.

The structure may be designed in such a way that after the valid time zone passes without a trouble, the message creating means 24 creates a message positively indicating the safety (e.g., "Safely arrived at the office today.") which is dispatched to the communication device 38 at the contact address by the cooperation of the automatic dialing means 20 and the message dispatching means 26.

Figure 5:
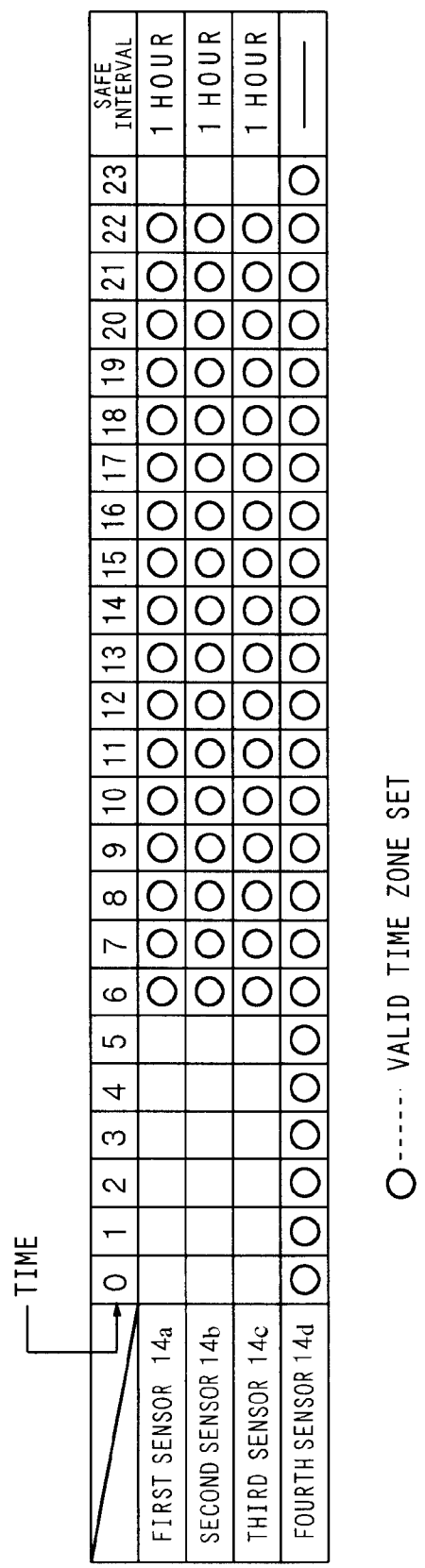
FIG. 5 is a timetable showing an example of the setting of valid time zones and safe intervals of individual sensors.

In case of elderly people who live alone or sick persons, they stay longer in their homes, so that as shown in FIG. 5, it is desirable to set wide valid time zones for the first to third sensors 14a to 14c and set the safe intervals in the temporal condition storage means 32.

Figure 6:
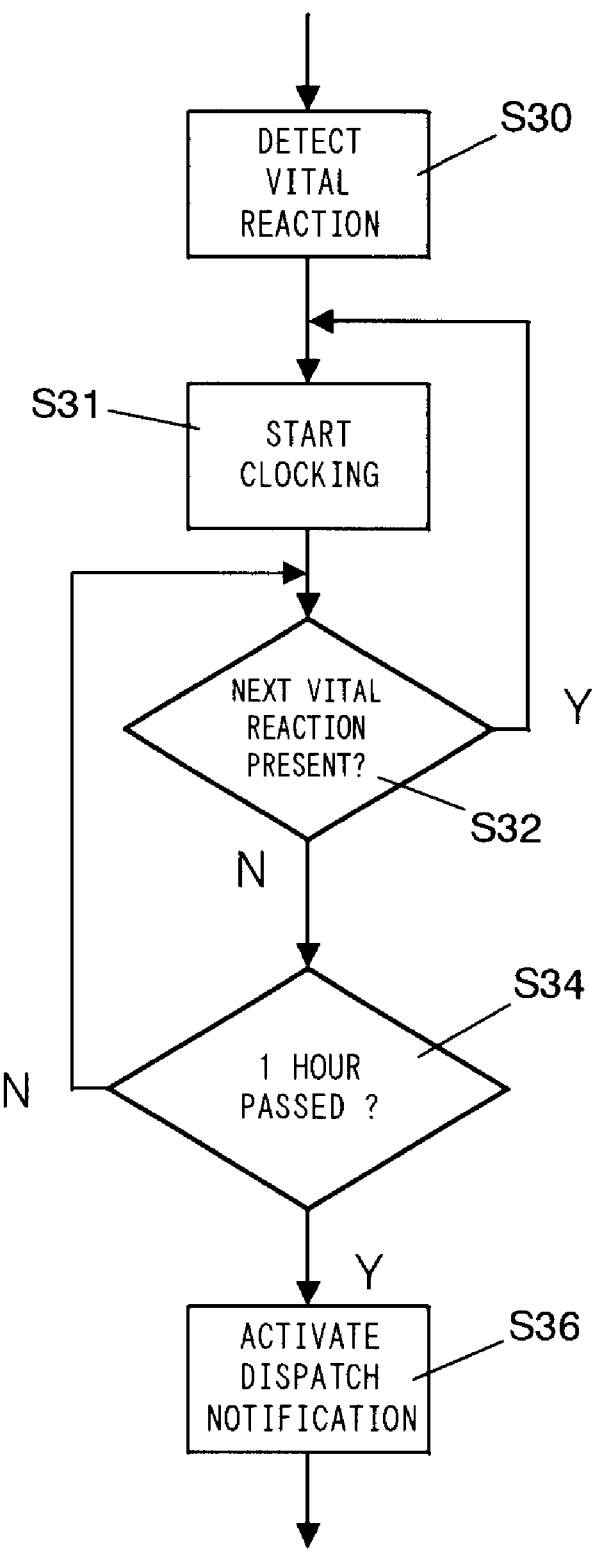
FIG. 6 is a flowchart illustrating another example of the operation of the first emergency dispatching system.

In case where the safe interval is set to "1 hour", for example, when any of the first to third sensors 14a to 14c detects the vital reaction of the monitored person (S30), the clocking means 36 starts counting down for one hour (S31), as shown in FIG. 6. When any of the first to third sensors 14a to 14c detects the vital reaction of the monitored person again in one hour (S32), the count-down is reset then and countdown for one hour starts from the beginning.

When the next vital reaction of the monitored person is not detected in this one hour (S34), "the occurrence of an emergency" is assumed and the safety judging means 16 activates the dispatch notifying operation (S36).

As the safe interval is set in addition to the valid time zone this way, even in case where a relatively wide valid time zone is set, it is possible to regularly check the safety of the monitored person.

The first to fourth sensors 14a to 14d are merely an example, and a greater number of sensors may be arranged to be able to more finely detect the occurrence of an emergency.

For example, the structure may be designed in such a way that a vital sensor unit which integrates a radio transmitter with vital sensors, such as a blood pressure sensor, a pulse sensor and a body temperature sensor, is attached to the body of the monitored person so that vital data of the person is regularly wirelessly transmitted to the control circuit 44.

In this case, when the value of the transmitted vital data is off the safe range preset in the judgment criterion storage means 34, the safety judging means 16 assumes the occurrence of an emergency and activates the dispatch notifying operation. This case is therefore particularly suitable for remote monitoring of sick persons or elderly people.

Or, a water level sensor may be attached to the bathtub so that when the water level equal to or higher than a predetermined level is detected, it can be assumed that an elderly person or the like who is a monitored person has sunk in the bathtub, which is regarded as "the occurrence of an emergency".

The sensors should not necessarily be provided inside a house but may be located outside, such as a yard, depending on the action pattern of the monitored person.

With regard to the setting of the temporal conditions for the sensors, finer judgment criteria in consideration of the purposes of providing the sensors can be set in the judgment criterion storage means 34, instead of making a simple judgment such that it is "safe" when there is an output indicating a vital reaction within the valid time zone.

At the time of judging an output from the pressure sensor placed in the mattress of a bed, for example, it can be assumed to be "safe" when a certain or higher pressure is detected between 10 PM and 6 AM, whereas when the pressurized state continues even after 6 AM, it can be assumed that the monitored person cannot rise for some reasons, such as being sick, and an "emergency has occurred".

Even with the same type of data output from the same sensor, as apparent from the above, changing the judgment criterion according to the time zone can ensure accurate judgment that matches the life pattern of the monitored person.

Or, in case where a "pressed state" indicating the fact that a person has sat is detected based on the output of the pressure sensor provided at the seat of the toilet, the clocking means 36 starts counting down and when the "pressed state" is not released even after a preset time (e.g., 30 minutes) has passed, the safety judging means 16 can assume something abnormal has occurred during the use of the toilet and activate the dispatch notifying operation.

Further, more precise judgment is possible by previously setting the association of the output of each sensor with those of the other sensors in the judgment criterion storage means 34, not singularly evaluating the output of each sensor.

In case where the "pressed state" indicating the fact that a person has sat is detected based on the output of the pressure sensor provided at the seat of the toilet and an output indicating the turning of the flush lever is not acquired from the limit switch attached to the flush lever even if an output indicating the release of the "pressed state" is detected within a preset time (e.g., 30 minutes), for example, it is possible to assume that the person has collapsed from the seat due to some reasons during the use of the toilet and activate the dispatch notifying operation.

Further, the voice input microphone 58 can be used as a sensor without a set valid time zone. In case where the monitored person intermittently utters the word "Help!" toward the microphone 58 three times in the night, for example, the safety judging means 16 judges that an emergency has occurred and activates the dispatch notification. In case of voices on the TV or mischief of visitors, a safety confirmation input should be made via the safety confirmation input means 30 to stop emergency dispatch.

Although the setting of the valid time-zone and other temporal conditions or the setting that is associated with the cooperation of the individual sensors can be input through the keys on the operation panel 60 provided on the dispatch control unit 42, individual setting items may have been input to the personal computer 90 using an application-specific program and may be transferred to the flash memory portion of the memory circuit 48. Or, the setting values can be input through dial buttons of the portable telephone 40 and transferred to the flash memory portion of the memory circuit 48 via the terminals 76 and 78.

Although the foregoing description illustrates an example where the message creating means 24 synthesizes voice data corresponding to a message pattern prepared beforehand in the message storage means 22, the monitored person may memorize a message in his own voice in message storage means 22 and dispatch the voice message to the contact address when an emergency occurs. In this case, the voice message is recorded in the memory circuit 48 through the microphone 58 incorporated in the dispatch control unit 42.

According to the first emergency dispatching system 10, the instant the portable telephone 40 is set in the charge recess 42a, the supply of the charging power from the power supply circuit 46 starts, and as this fact is output to the control circuit 44, the safety monitoring mode in the safety judging means 16 starts. The instant the portable telephone 40 is detached from the charge recess 42a to stop charging, the safety monitoring mode in the safety judging means 16 is temporarily canceled.

That is, the power supply circuit 46 serves as charge detecting means. Of course, an exclusive sensor which detects the setting of the portable telephone 40 in the recess 42a may be provided.

If the mode goes to the safety monitoring mode as the portable telephone 40 is set in the charge recess 42a and temporarily leaves the safety monitoring mode by detaching the former, the monitored person can start using the first emergency dispatching system 10 the instant he goes home and can automatically stop its usage when going out, without being much conscious of the presence of this system.

To prevent carelessly forgetting setting the portable telephone 40 in the dispatch control unit 42 as a charger at the time of going home, it is effective to attach a pair of some kinds of sensors to the portable telephone 40 and the dispatch control unit 42 and generate an alarm sound from the alarm buzzer 64 of the dispatch control unit 42 when both come close to a given range, thereby prompting the attachment.

It is possible to carelessly forget the portable telephone 40 home at the time of going out. Even in this case, as the valid time zone of each sensor 14 is set in the above-described manner, a false report may not be dispatched immediately, but it is desirable to take some measure to cancel the safety monitoring mode from outside.

For example, possible setting is such that in case where a call is made to one's own portable telephone 40 left home from a public telephone or the like and the calling tone which is input through the microphone 58 continues 30 times or more, the safety monitoring mode is temporarily canceled.

Or, when the portable telephone 40 is set to vibrate to indicate an incoming call, the vibration sensor 52 may detect it and when the calling vibration continues for two minutes or longer, the safety monitoring mode may be temporarily canceled automatically.

To prevent the portable telephone 40 from being left home when going out, a non-contact type IC chip may be incorporated in the portable telephone 40 and bringing the portable telephone 40 over a receiver sited near the entrance hall may complete locking the front door.

Of course, an exclusive switch may be provided on the dispatch control unit 42 so that the ON/OFF of the safety monitoring mode is intentionally controlled.

Instead of achieving the functions of the safety judging means 16, the automatic dialing means 20, the message creating means 24, the message dispatching means 26 and the clocking means 36 as the control circuit 44 runs the control program stored in the memory circuit 48, the emergency dispatching system can also be constructed by so-called wired logic of wiring exclusive integrated circuits corresponding to the functions.

Instead of constructing the contact address storage means 18, the message storage means 22, the temporal condition storage means 32 and the judgment criterion storage means 34 by semiconductor memories, such as flash memories, they may be constructed by other storage media (e.g., a hard disk).

Although the dispatch control unit 42 is constructed by incorporating the control circuit 44, the memory circuit 48 and so forth in the charger of the portable telephone 40 and the safety judging means 16, the automatic dialing means 20, the message creating means 24, the message dispatching means 26 and the clocking means 36 are realized as the control circuit 44 executes the control program stored in the memory circuit 48 (ROM) in the above-described embodiment, the invention is not limited to this type.

That is, the emergency dispatching system can be realized by incorporating the control circuit 44, the memory circuit 48 and so forth in the portable telephone as the communication device 12 on the monitored person side.

Figure 7:
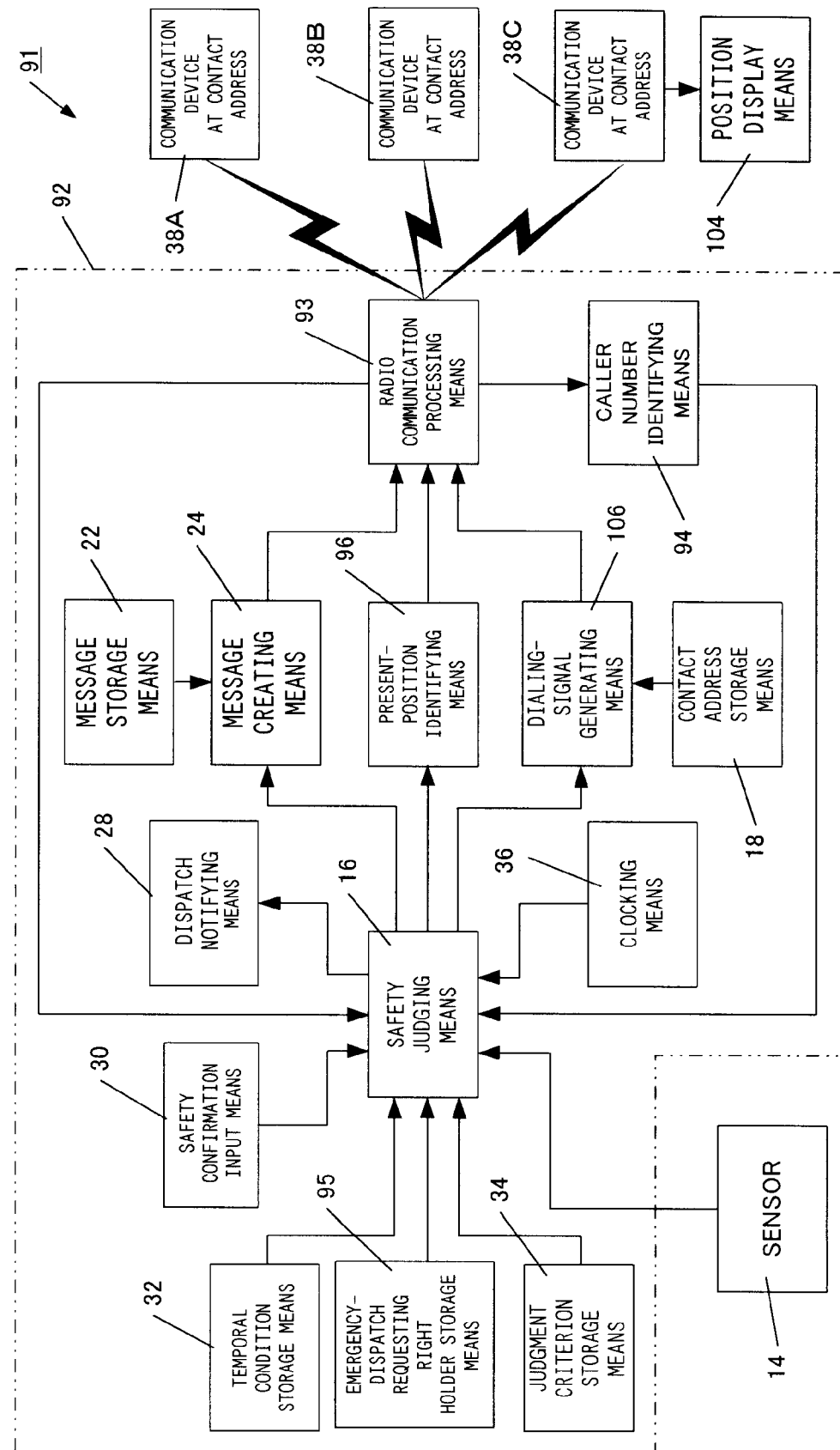
FIG. 7 is a functional block diagram illustrating a second emergency dispatching system according to the invention.

FIG. 7 is a functional block diagram illustrating one example of the functional structure in that case. This second emergency dispatching system 91 has safety judging means 16, contact address storage means 18, dialing-signal generating means 106, message storage means 22, message creating means 24, dispatch notifying means 28, safety confirmation input means 30, temporal condition storage means 32, judgment criterion storage means 34, clocking means 36, radio communication processing means 93, caller number-identifying means 94, emergency-dispatch requesting right holder storage means 95 and present-position identifying means 96 in the casing of a portable telephone 92 which is a communication device on a monitored person side.

A sensor 14 is arranged outside the casing. For example, a pedometer the monitored person wears or a pulse meter or the like built in a wrist watch corresponds to the sensor 14. The outputs of those sensors 14 are input to the safety judging means 16 in the portable telephone 92 wirelessly or by a cable.

Figure 8:
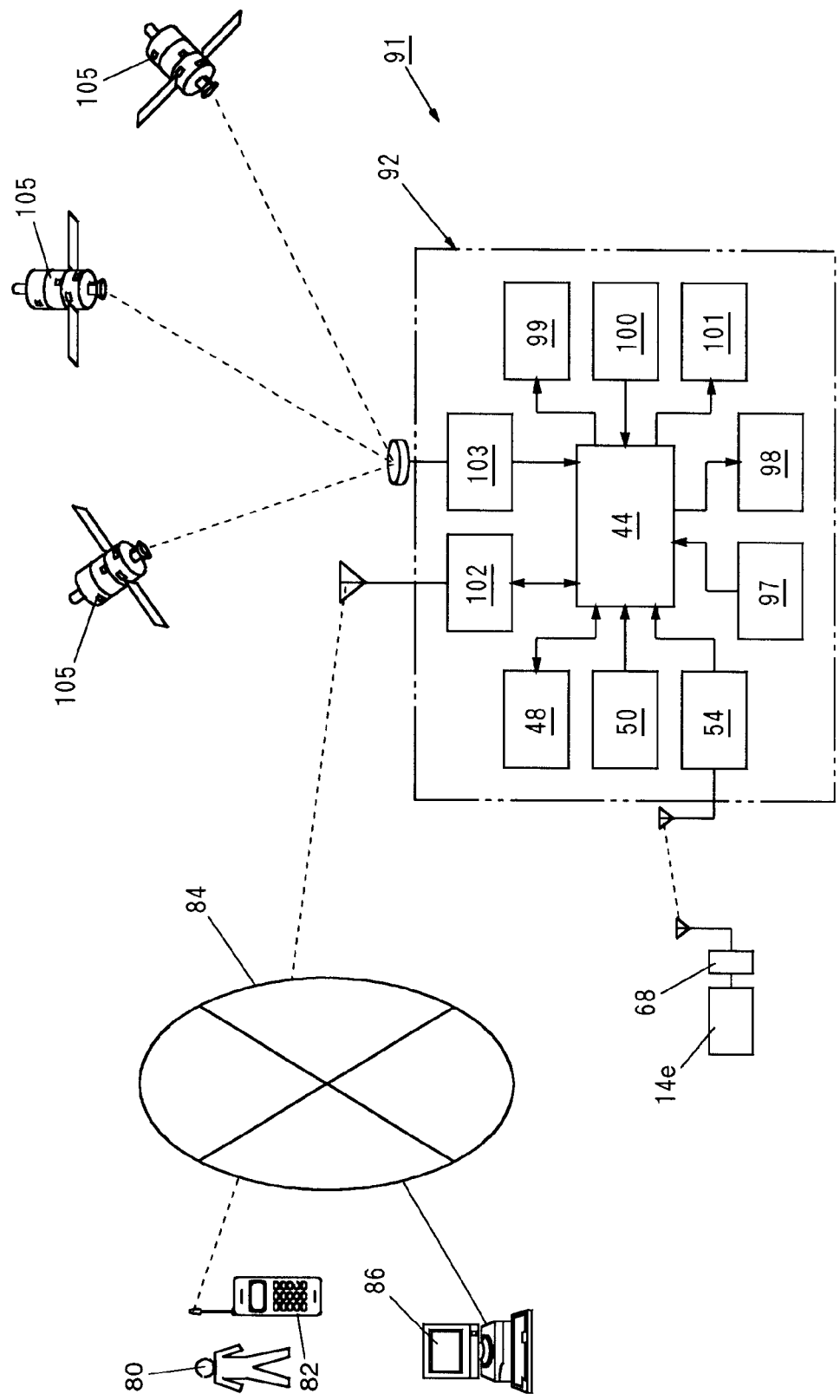
FIG. 8 is a conceptual diagram showing an example of the hardware structure of the second emergency dispatching system.

FIG. 8 shows an example of the hardware structure of the emergency dispatching system 91. Located in the portable telephone 92 is a control circuit 44 comprised of a CPU (Central Processing Unit), and a memory circuit 48 including a RAM and ROM or flash memory, a clock circuit 50, a radio processing circuit 54, push buttons 97, an LCD display 98, a speaker 99, a microphone 100 a vibrator 101, a radio interface 102 and a GPS receiver 103 are each connected to the control circuit 44 via an unillustrated interface circuit.

A sensor 14e located outside the portable telephone 92 is connected to the control circuit 44 via the radio transmission unit 68 and the radio processing circuit 54 or the like.

Stored in the ROM of the memory circuit 48 is a control program for achieving various functions of the emergency dispatching system. As the control circuit 44 runs the control program, the second emergency dispatching system 91 is equipped with various functions, such as the aforementioned safety judging means 16, dialing-signal generating means 106, message creating means 24, clocking means 36, radio communication processing means 93, caller number identifying means 94 and present-position identifying means 96.

The flash memory portion of the memory circuit 48 accomplishes functions of the contact address storage means 18, message storage means 22, temporal condition storage means 32, judgment criterion storage means 34 and emergency-dispatch requesting right holder storage means 95.

The speaker 99 and the vibrator 101 correspond to the dispatch notifying means 28, and a specific button in the push buttons 97 corresponds to the safety confirmation input means 30.

The clock circuit 50 supplies temporal data to the emergency dispatching system 91 and the GPS receiver 103 supplies present position data.

In the case of the emergency dispatching system 91, because most functions are provided in the portable telephone 92, it is possible to keep monitoring the safety even while the monitored person is out and automatically make dispatching to a predetermined contact address in case of emergency.

At the time the monitored person does a dangerous outdoor activity, such as mount climbing, fishing in a sea or sailing, or the monitored person who has a chronic illness, such as epilepsy goes out, the monitored person wears a pedometer or a wrist watch which the sensor 14e is built in, and carries the portable telephone 92 around.

The pedometer normally outputs a step number count signal to the control circuit 44 of the portable telephone 92 via the radio transmission unit 68 and the radio processing circuit 54. Or, a pulse sensor or a body temperature sensor built in the belt portion of a wrist watch normally outputs a signal corresponding to the pulses or the body temperature to the control circuit 44 via the radio transmission unit 68 and the radio processing circuit 54.

The safety judging means 16 refers to the setting conditions in the temporal condition storage means 32 and the set criterion in the judgment criterion storage means 34 and analyzes the output signal of the sensor 14e to judge the safety of the monitored person.

In case where the output of the pulse sensor significantly falls below the set value or there is an output indicating zero pulse, for example, the safety judging means 16 assumes the occurrence of an emergency and performs dispatch notification through a calling tone or calling vibration of the portable telephone 92. In this case, it is desirable to preset an exclusive melody or a vibration pattern for dispatch notification in order to distinguish it from a normal calling tone or calling vibration.

In case where the monitored person temporarily takes off the wrist watch for the personal reasons of the monitored person, dispatch notification can be canceled by making a safety confirming input by pressing a predetermined push button of the portable telephone 92 within a predetermined time.

In case where a critical problem, such as the spasm of chronic illness, actually occurs on the monitored person side, and a safety confirming input cannot be made within the time, the safety judging means 16 judges that an emergency has occurred, the message creating means 24 creates a message in case of emergency, the dialing-signal generating means 106 generates a dialing signal corresponding to the telephone number of the contact address and executes automatic dialing and message dispatching to communication devices 38A and 38B at contact addresses via the radio communication processing means 93. That is, in the second emergency dispatching system 91, the cooperation of the dialing-signal generating means 106 with the radio communication processing means 93 realizes the automatic dialing means, the cooperation of the message creating means 24 with the radio communication processing means 93 realizes the message dispatching means.

The present-position identifying means 96 sends data indicating the present position of the monitored person to a communication device 38C at a contact address, and position display means 104 connected to the communication device 38C displays the present position of the monitored person.

The second emergency dispatching system 91 is expected to mainly detect the occurrence of an emergency outside. In this case, even if the first report indicating the occurrence of an emergency is given to a relative or the like, nothing can be done unless the location of the monitored person is known. It is therefore very important to dispatch present position information together with the occurrence of an emergency.

Specifically, the GPS receiver 103 built in the portable telephone 92 receives a signal from a satellite 105, and the control circuit 44 processes the signal according to an exclusive program to find the present position, inserts the present position data in a communication signal of the portable telephone 92 and sends it to the communication device 38C at the contact address.

A personal computer 86 which is equipped with a communication capability and is placed in a security company, a police station, a fire station or the like corresponds to the communication device 38C at the contact address, and numerals that indicate the latitude and longitude of the place of the occurrence of the emergency are displayed together with a text message indicating the occurrence of an emergency on the screen of the personal computer 86. Or, interlocked with an application-specific program, the location of the occurrence of the emergency can be displayed on the map of the screen.

The use of a PHS system (Personal Handy Phone System) as the portable telephone of the monitored person can allow the present position of the monitored person to be caught by using a positional information service which a communication carrier generally provides, without incorporating the present-position identifying means or GPS receiver in the portable telephone.

Although an example of incorporating a sensor for detecting the safety of the monitored person in a pedometer or a wrist watch which is located outside the portable telephone 92 is illustrated above, the sensor can of course be built in the portable telephone 92 itself.

The simplest way possible is to use the microphone. 100 of the portable telephone 92 as a voice input sensor. As a result, when the monitored person who carries the portable telephone 92 cries out "Help! Help! Help!", for example, the microphone 100 picks up the voice and outputs it to the safety judging means 16. When "the occurrence of an emergency" is assumed by the safety judging means 16, an alarm sound (alarm vibration) is generated as dispatch notification and when there is no safety confirming input within a given time (desirably about several seconds), the occurrence of an emergency and present position information can spontaneously and automatically be reported to the family and a police. This can be said to be helpful to a woman against a stalker.

Although the microphone 100 may of course pick up voices on the TV or movie, resulting in possible assumption of the occurrence of an emergency, dispatch notification is done beforehand to give a chance to make a safety confirming input, so that the generation of false reports can be suppressed to a certain degree. Further, other voices than those of the monitored person can be eliminated by performing a simple voice recognition process or voiceprint discrimination process on the portable telephone 92.

As the second emergency dispatching system 91 is equipped with the caller number identifying means 94 and the emergency-dispatch requesting right holder storage means 95, only a specific person concerned which has been set in advance can request emergency dispatching to the system 91 from the outside.

That is, although each of the emergency dispatching processes that have been discussed so far determines whether emergency dispatching is necessary or not on the system side in accordance with the outputs of the sensors, it becomes necessary for an external person concerned to be able to control emergency dispatching in a certain case.

One case may be that, for example, a worker who is a monitored person and takes up a job, leaving a family behind, does not appear at the office even by nearly noon and emergency dispatching is not made to the portable telephone of a supervisor who is registered as one contact address. Normally "no emergency dispatching made by the monitored person" means "well". In this case, however, the objective event, "the worker has not appeared at the office after the office hour", that implies an emergency has actually occurred and there is a possibility that the system has overlooked the emergency due to malfunction of the sensors or mis-setting, so that some measures should be taken promptly.

In the second emergency dispatching system 91, therefore, the telephone number of a person of a certain range who is trusted by the monitored person is registered in the emergency-dispatch requesting right holder storage means 95 of the portable telephone 92 and when a predetermined condition is met, emergency dispatching can be carried out by the intention of the third person.

Figure 9:
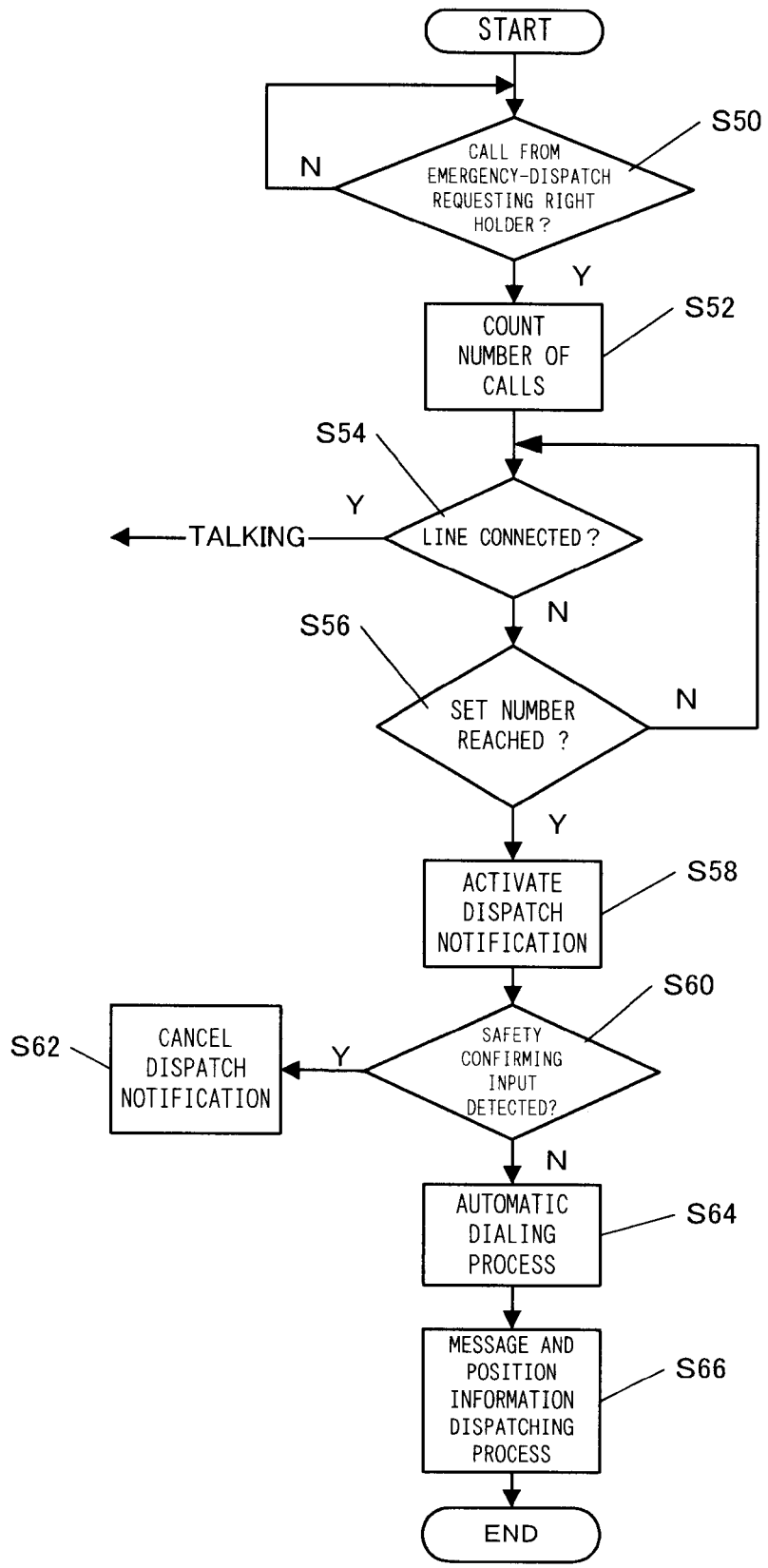
FIG. 9 is a flowchart illustrating the procedures of an emergency dispatching process of the second emergency dispatching system based on the intention of a third person.

The following describes procedures of emergency dispatching by the intention of a third person according to the flowchart in FIG. 9.

First, in the previous case where the number of the portable telephone of a supervisor as an emergency-dispatch requesting right holder is set in the portable telephone 92 of a worker (subordinate) as a monitored person, the supervisor who becomes suspicious about the absence of the subordinate inputs the number of the portable telephone of the subordinate through his own portable telephone.

As a result, the caller number identifying means 94 in the portable telephone 92 of the subordinate identifies the number of the portable telephone of the caller (supervisor) via the radio communication processing means 93 and sends it to the safety judging means 16. This caller number information is automatically transmitted to the portable telephone 92 from an exchange included in a public line network through a caller-number reporting service which is generally provided by a communication carrier, such as NTT.

The safety judging means 16 refers to the emergency-dispatch requesting right holder storage means 95 to judge whether or not the caller number matches with the number registered as an emergency-dispatch requesting right holder (S50). When there is a match, it is discriminated as a call from a person who has the emergency-dispatch requesting right and counting the number of calling signals to be sent from the radio communication processing means 93 starts (S52).

Thereafter, when the line to the portable telephone 92 of the monitored person is immediately established to form a communication path (S54), it means that the monitored person is well and the supervisor has only to directly ask the subordinate about the situation through the ordinary telephone communication.

In case where the line is not connected even after the calling tone is generated a given number of times, on the other hand, the occurrence of an emergency is really expected (S56), so that the safety judging means 16 generates from the speaker voices of a melody different from that of the calling tone so far, activating dispatch notification (S58).

If the monitored person (subordinate) is surprised by the dispatch notification sound and depresses the communication button, the safety judging means 16 judges that a safety confirming input has been made (S60) and cancels the dispatch notification (S62).

In this case too, the supervisor has only to ask the subordinate about the situation through the ordinary telephone communication.

In case where the safety confirming operation cannot be detected even after a given time (several tens of seconds to 1 minute) since dispatch notification, by way of contrast, it is judged that the probability of the occurrence of an emergency is very high and a message such that "As an emergency is likely to have occurred, please urgently report to a person concerned." is returned to the emergency-dispatch requesting right holder (supervisor). The line is then disconnected.

Thereafter, automatic dialing to the communication devices 38A and 38B at the contact addresses registered in the contact address storage means 18 is executed in accordance with the same steps as mentioned above (S64) and a message indicating the occurrence of an emergency is transmitted (S66). At the same time, the present-position identifying means 96 and the radio communication processing means 93 send the position information of the portable telephone 92 to the communication device 38C.

Because the telephone number of the trusted emergency-dispatch requesting right holder is registered beforehand in the portable telephone 92 of the monitored person and the caller number identifying means 94 identifies the telephone number of the caller every time a call is made, and only when both match with each other, the emergency dispatching operation is activated, it is possible to prevent random emergency dispatching from being activated by mischief or harassment.

To distinguish the ordinary call from the emergency-dispatch requesting right holder (a call intended to talk by phone), it is of course necessary to set the criterion for determining the "emergency" in the judgment criterion storage means 34. For example, a condition (calling pattern) which is generally unlikely to occur, such as a call from the emergency-dispatch requesting right holder and the calling tone being generated 50 times continuously, should be set. Or, setting may be made in such a way that "the occurrence of an emergency" is assumed when the call is from the emergency-dispatch requesting right holder, the line is disconnected once after the calling tone is generated 20 times, and then the calling tone is generated 20 times again.

Even in this case, emergency dispatching is not carried out immediately after calling is made a certain number of times, but dispatch notification is preformed to give the monitored person a chance to make a safety confirming input, thereby preventing emergency dispatching from being activated when the monitored person pretends to be out.

The emergency-dispatch requesting system based on the intention of a third person can of course be incorporated in the first emergency dispatching system 10. That is, the structure is designed in such a way that an emergency-dispatch requesting right holder is registered in the memory circuit 48 in the dispatch control unit 42 and when the portable telephone 40 receives a call, the caller number is output to the control circuit 44 via the data input/output terminals 76 and 78 and the communication processing circuit 56.

When a call from the emergency-dispatch requesting right holder is identified, the calling tone should be picked up by the microphone 58 and the number of calls should be counted or the calling vibration should be picked up by the vibration sensor 52 and the number of calls should be counted. Dispatch notification is realized through the alarm buzzer 64.

Industrial Applicability

With the use of the emergency dispatching system according to the invention, as described above, even in case where the safety judging means identifies the occurrence of an emergency based on the outputs of various sensors, emergency dispatching is not made immediately, but a monitored person is warned by the dispatch notifying means to give the monitored person a chance to inhibit emergency dispatching. This can prevent the occurrence of false reports.

When it is judged that an emergency has occurred, an emergency reporting message is automatically dispatched to the communication device at a preset contact address, so that if the number of the portable telephone or the like which a relative or a caretaker carries is registered as the contact address, the first report on the occurrence of an emergency can reliably be acquired, thus ensuring later self-helping protection and helping activities.

As it is designed such that various sensors detect the vital reactions of the monitored person, an internal danger of the monitored person can be detected reliably.

What is claimed is:

1. An emergency dispatching system characterized by comprising:

a communication device on a monitored person side which is connectable to a communication line;

at least one sensor for sensing a vital reaction of a monitored person or an external, danger thereof;

contact address storage means where at least one telephone number to contact in case of emergency is stored;

message storage means at least one message to be sent in case of emergency is stored;

safety judging means for judging a safety of said monitored person based on an output of said sensor;

dispatch notifying means for warning said monitored person of an emergency when it is assumed by said safety judging means that said emergency has occurred;

automatic dialing means for generating a dialing signal corresponding to a telephone number of the contact address and outputting said dialing signal to said communication device on said monitored person side, thereby establishing a call to a communication device at said contact address, in case where a safety confirmation input is not detected within a certain time since warning made by said dispatch notifying means; and message dispatching means for sending an emergency message stored in said message storage means to said communication device at said contact address via said communication device on said monitored person side after establishment of a communication line between said communication device on said monitored person side and said communication device at said contact address, and in that said communication device on said monitored person side is a radio telephone, said contact address storage means, said message storage means, said safety judging means, said dispatch notifying means, said automatic dialing means and said message dispatching means are retained in a charger of said radio telephone, and said sensor is connected to said safety judging means by a cable or wirelessly.

2. The emergency dispatching system according to claim 1, characterized by comprising charging state detecting means for detecting whether or not said radio telephone is set in said charger, and in that a safety monitoring operation of said safety judging means starts at a same time said radio telephone is set in said charger, and said safety monitoring operation is temporarily canceled at a same time said radio telephone is detached from said charger.

3. The emergency dispatching system according to claim 2, characterized by comprising call detecting means for detecting a ring-back tone or ringing vibration when a call is made to said radio telephone, and in that said safety monitoring operation of said safety judging means is temporarily canceled in case where said ring-tone or ring vibration of said radio telephone continues for a predetermined time or longer.

4. The emergency dispatching system according to claim 3, characterized by comprising temporal condition storage means in which a valid time zone for said sensor is set beforehand, and in that said safety judging means judges a safety of said monitored person based on an output result from said sensor acquired during said valid time zone.

5. The emergency dispatching system according to claim 4, characterized in that a safe interval in said valid time zone is set in said temporal condition storage means, and said safety judging means assumes an occurrence of an emergency in case where an output indicating a vital reaction of said monitored person is not obtained during said safe interval.

6. The emergency dispatching system according to claim 2, characterized by comprising temporal condition storage means in which a valid time zone for said sensor is set beforehand, and in that said safety judging means judges a safety of said monitored person based on an output result from said sensor acquired during said valid time zone.

7. The emergency dispatching system according to claim 6, characterized in that a safe interval in said valid time zone is set in said temporal condition storage means, and said safety judging means assumes an occurrence of an emergency in case where an output indicating a vital reaction of said monitored person is not obtained during said safe interval.

8. The emergency dispatching system according to claim 1, characterized by comprising temporal condition storage means in which a valid time zone for said sensor is set beforehand, and in that said safety judging means judges a safety of said monitored person based on an output result from said sensor acquired during said valid time zone.

9. The emergency dispatching system according to claim 8, characterized in that a safe interval in said valid time zone is set in said temporal condition storage means, and said safety judging means assumes an occurrence of an emergency in case where an output indicating a vital reaction of said monitored person is not obtained during said safe interval.

10. The emergency dispatching system according to claim 8, characterized in that a plurality of messages associated with outputs of individual sensors are stored in said message storage means in advance, and said message dispatching means dispatches a message corresponding to that sensor output which has become a basis for judgment of an occurrence of an emergency by said safety judging means to said communication device at said contact address.

11. The emergency dispatching system according to claim 10, characterized by comprising:

caller-number identifying means for identifying a telephone number of a caller when a call is made to said communication device on said monitored person side; and emergency-dispatch requesting right holder storage means where a telephone number of a person who has been authorized beforehand as an emergency-dispatch requesting right bolder is stored, and in that said safety judging means judges whether or not said caller is said emergency-dispatch requesting right holder by comparing said telephone number stored in said emergency-dispatch requesting right holder storage means with a telephone number output from said caller-number identifying means, when said caller is said emergency-dispatch requesting right holder and calling from said caller matches with a preset pattern, it is assumed that an emergency has occurred and said monitored person is warned of that emergency via said dispatch notifying means, and when said safety confirmation input is not detected within a certain time since warning made by said dispatch notifying means, said message dispatching means dispatches an emergency message to said communication device at said contact address.

12. The emergency dispatching system according to claim 8, characterized by comprising:

caller-number identifying means for identifying a telephone number of a caller when a call is made to said communication device on said monitored person side; and emergency-dispatch requesting right holder storage means where a telephone number of a person who has been authorized beforehand as an emergency-dispatch requesting right holder is stored, and in that said safety judging means judges whether or not said caller is said emergency-dispatch requesting right holder by comparing said telephone number stored in said emergency-dispatch requesting right holder storage means with a telephone number output from said caller-number identifying means, when said caller is said emergency-dispatch requesting right holder and calling from said caller matches with a preset pattern, it is assumed that an emergency has occurred and said monitored person is warned of that emergency via said dispatch notifying means, and when said safety confirmation input is not detected within a certain time since warning made by said dispatch notifying means, said message dispatching means dispatches an emergency message to said communication device at said contact address.

13. The emergency dispatching system according to claim 1, characterized in that a plurality of messages associated with outputs of individual sensors are stored in said message storage means in advance, and said message dispatching means dispatches a message corresponding to that sensor output which has become a basis for judgment of an occurrence of an emergency by said safety judging means to said communication device at said contact address.

14. The emergency dispatching system according to claim 1, characterized by comprising:

caller-number identifying means for identifying a telephone number of a caller when a call is made to said communication device on said monitored person side; and emergency-dispatch requesting right holder storage means where a telephone number of a person who has been authorized beforehand as an emergency-dispatch requesting right holder is stored, and in that said safety judging means judges whether or not said caller is said emergency-dispatch requesting right holder by comparing said telephone number stored in said emergency-dispatch requesting right holder storage means with a telephone number output from said caller-number identifying means, when said caller is said emergency-dispatch requesting right holder and calling from said caller matches with a preset pattern, it is assumed that an emergency has occurred and said monitored person is warned of that emergency via said dispatch notifying means, and when said safety confirmation input is not detected within a certain time since warning made by said dispatch notifying means, said message dispatching means dispatches an emergency message to said communication device at said contact address.

15. The emergency dispatching system said having a radio telephone on a monitored person side which is connectable to a communication line, and at least one sensor for sensing a vital reaction of a monitored person or an external danger thereof, characterized in that said radio telephone comprises:

contact address storage means where at least one telephone number to contact in case of emergency is stored;

message storage means where at least one message to be sent in case of emergency is stored;

safety judging means for judging a safety of said monitored person based on a output of said sensor;

dispatch notifying means for warming said monitored person of an emergency when it is assumed by said safety judging means that said emergency has occurred;

automatic dialing means for generating a dialing signal corresponding to a telephone number of the contact address, thereby establishing a call to a communication device at said contact address, in case where a safety confirmation input is not detected within a certain time since warming made by said dispatch notifying meaus; and message dispatching means for sending an emergency message stored in said storage means to said communication device at said contact address after establishment of a communication line with said communication device at said contact address; and said sensor is connected to said safety judging means by a cable or wirelessly.

16. An emergency dispatching system according to claim 15, characterized in that said radio telephone has present-position identifying means for identifying a present position of said radio telephone, and present position information output from said present-position identifying means is dispatched to said communication device at said contact address at a time of the emergency dispatching.

17. The emergency dispatching system according to claim 16, characterized by comprising temporal condition storage means in which a valid time zone for said sensor is set beforehand, and in that said safety judging means judges a safety of said monitored person based on an output result from said sensor acquired during said valid time zone.

18. The emergency dispatching system according to claim 17, characterized in that a safe interval in said valid time zone is set in said temporal condition storage means, and said safety judging means assumes an occurrence of an emergency in case where an output indicating a vital reaction of said monitored person is not obtained during said safe interval.

19. The emergency dispatching system according to claim 15, characterized by comprising temporal condition storage means in which a valid time zone for said sensor is set beforehand, and in that said safety judging means judges a safety of said monitored person based on an output result from said sensor acquired during said valid time zone.

20. The emergency dispatching system according to claim 19, characterized in that a safe interval in said valid time zone is set in said temporal condition storage means, and said safety judging means assumes an occurrence of an emergency in case where an output indicating a vital reaction of said monitored person is not obtained during said safe interval.

21. The emergency dispatching system according to claim 19, characterized in that a plurality of messages associated with outputs of individual sensors are stored in said message storage means in advance, and said message dispatching means dispatches a message corresponding to that sensor output which bas become a basis for judgment of an occurrence of an emergency by said safety judging means to said communication device at said contact address.

22. The emergency dispatching system according to claim 21, characterized by comprising:

caller-number identifying means for identifying a telephone number of a caller when a call is made to said communication device on said monitored person side; and emergency-dispatch requesting right holder storage means where a telephone number of a person who has been authorized beforehand as an emergency-dispatch requesting right holder is stored, and in that said safety judging means judges whether or not said caller is said emergency-dispatch requesting right holder by comparing said telephone number stored in said emergency-dispatch requesting right holder storage means with a telephone number output from said caller-number identifying means, when said caller is said emergency-dispatch requesting right holder and calling from said caller matches with a preset pattern, it is assumed that an emergency has occurred and said monitored person is warned of that emergency via said dispatch notifying means, and when said safety confirmation input is not detected within a certain time since warning made by said dispatch notifying means, said message dispatching means dispatches an emergency message to said communication device at said contact address.

23. The emergency dispatching system according to claim 19, characterized by comprising:

caller-number identifying means for identifying a telephone number of a caller when a call is made to said communication device on said monitored person side; and emergency-dispatch requesting right holder storage means where a telephone number of a person who has been authorized beforehand as an emergency-dispatch requesting right holder is stored, and in that said safety judging means judges whether or not said caller is said emergency-dispatch requesting right holder by comparing said telephone number stored in said emergency-dispatch requesting right holder storage means with a telephone number output front said caller-number identifying means, when said caller is said emergency-dispatch requesting right holder and calling from said caller matches with a preset pattern, it is assumed that an emergency has occurred and said monitored person is warned of that emergency via said dispatch notifying means, and when said safety confirmation input is not detected within a certain time since warning made by said dispatch notifying means, said message dispatching means dispatches an emergency message to said communication device at said contact address.

24. The emergency dispatching system according to claim 15, characterized in that a plurality of messages associated with outputs of individual sensors are stored in said message storage means in advance, and said message dispatching means dispatches a message corresponding to that sensor output which has become a basis for judgment of an occurrence of an emergency by said safety judging means to said communication device at said contact address.

25. The emergency dispatching system according to claim 15, characterized by comprising:

caller-number identifying means for identifying a telephone number of a caller when a call is made to said communication device on said monitored person side; and emergency-dispatch requesting right holder storage means where a telephone number of a person who has been authorized beforehand as an emergency-dispatch requesting right holder is stored, and in that said safety judging means judges whether or not said caller is said emergency-dispatch requesting right holder by comparing said telephone number stored in said emergency-dispatch requesting right holder storage means with a telephone number output from said caller-number identifying means, when said caller is said emergency-dispatch requesting right holder and calling from said caller matches with a preset pattern, it is assumed that an emergency has occurred and said monitored person is warned of that emergency via said dispatch notifying means, and when said safety confirmation input is not detected within a certain time since warning made by said dispatch notifying means, said message dispatching means dispatches an emergency message to said communication device at said contact address.

* * * * *